US008015899B2

(12) United States Patent
Gianone et al.

(10) Patent No.: US 8,015,899 B2
(45) Date of Patent: Sep. 13, 2011

(54) DIFFERENTIAL GEAR ASSEMBLY AND METHOD

(75) Inventors: Roberto Gianone, Barengo (IT);
Milenko Kvrgic, Lindesberg (SE);
Hussein Kalaoui, Philadelphia, PA (US)

(73) Assignee: Meritor Heavy Vehicle Systems Cameri SpA, Cameri (Novara) (IT)

( * ) Notice: Subject to any disclaimer, the term of this patent is extended or adjusted under 35 U.S.C. 154(b) by 300 days.

(21) Appl. No.: 12/162,015

(22) PCT Filed: Jan. 26, 2007

(86) PCT No.: PCT/GB2007/000273
§ 371 (c)(1),
(2), (4) Date: Oct. 22, 2008

(87) PCT Pub. No.: WO2007/085848
PCT Pub. Date: Aug. 2, 2007

(65) Prior Publication Data
US 2009/0205463 A1 Aug. 20, 2009

(30) Foreign Application Priority Data
Jan. 27, 2006 (GB) .................. 0601720.6

(51) Int. Cl.
*F16H 57/02* (2006.01)
(52) U.S. Cl. ..................................... 74/606 R
(58) Field of Classification Search ................ 74/606 R
See application file for complete search history.

(56) References Cited

U.S. PATENT DOCUMENTS

| 4,125,026 A | 11/1978 | Torii et al. |
| 4,836,051 A * | 6/1989 | Guimbretiere .................. 475/85 |
| 2001/0030224 A1 | 10/2001 | Eulenstein et al. |

FOREIGN PATENT DOCUMENTS

| AT | 3253 | 12/1999 |
| DE | 4042173 | 7/1992 |
| DE | 10238236 | 3/2004 |
| EP | 1719572 | 4/2006 |
| FR | 2343403 | 9/1977 |
| JP | 06109085 | 4/2004 |
| JP | 2005081351 | 3/2005 |

OTHER PUBLICATIONS

International Search Report mailed Mar. 29, 2007.
United Kingdom Search Report dated May 19, 2006.

* cited by examiner

*Primary Examiner* — Vicky Johnson
(74) *Attorney, Agent, or Firm* — Carlson, Gaskey & Olds, PC

(57) ABSTRACT

An assembly of a crown wheel and a differential casing of a differential gear assembly is adapted to welding. The differential casing has a circular flange with an axially extending lip engaged in a circular groove of the crown wheel, which is further relieved at a radially outer side to give clearance for a high energy welding beam. An interface between the crown wheel and the circular flange is in one example a frusto-conical surface, which presents an oblique angle to the welding beam.

15 Claims, 3 Drawing Sheets

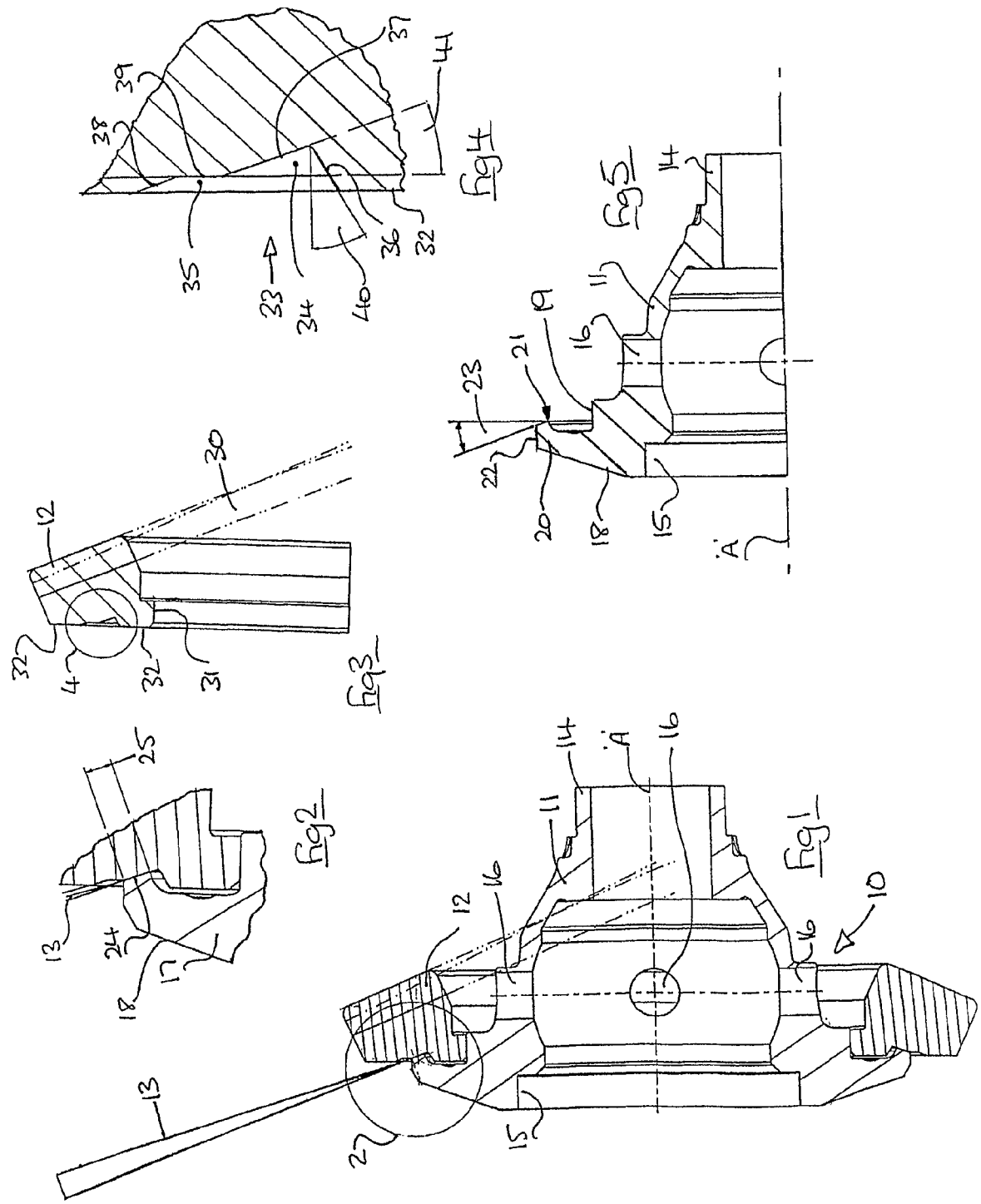

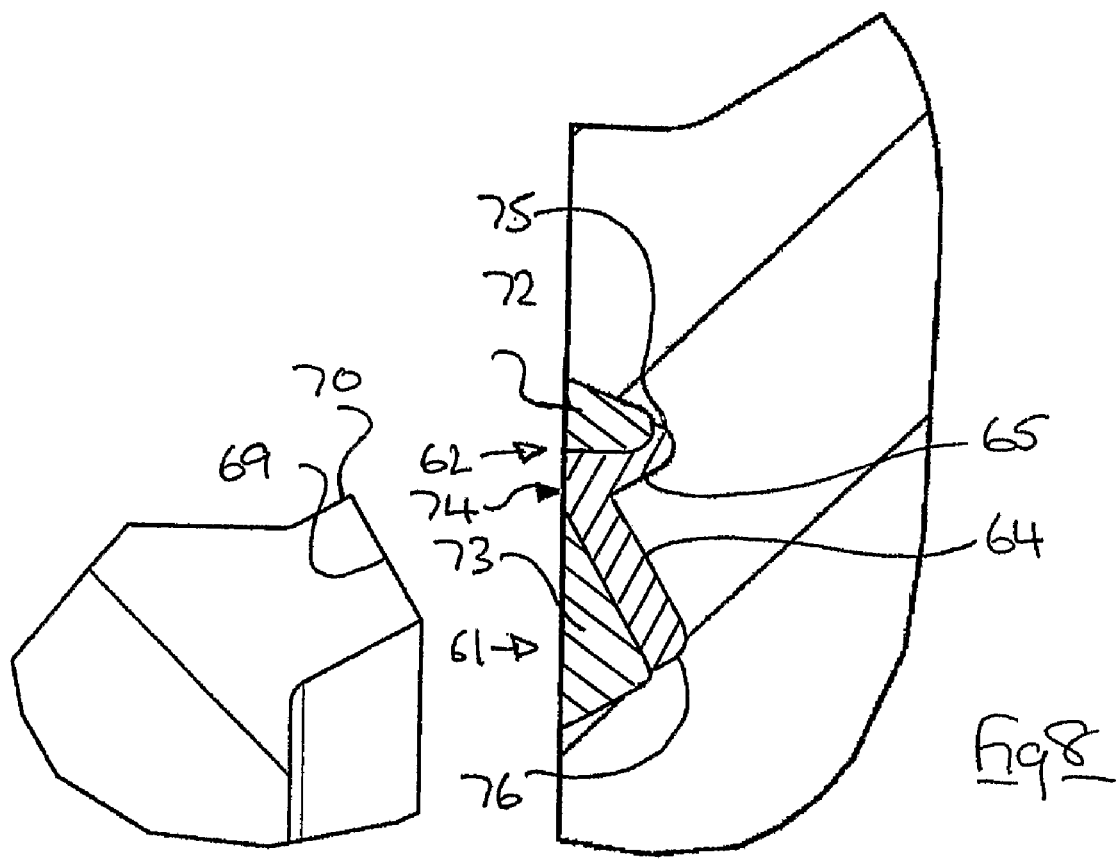
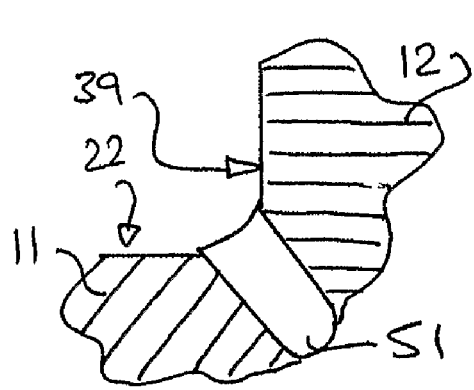
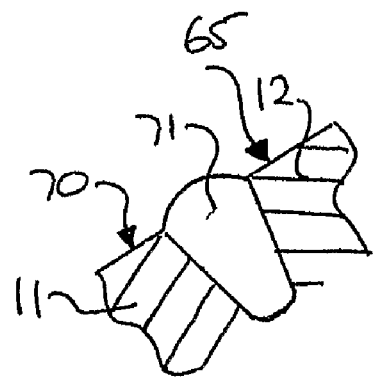

DIFFERENTIAL GEAR ASSEMBLY AND METHOD

REFERENCE TO RELATED APPLICATIONS

This application is a U.S. National Phase Application of PCT Application No. PCT/GB2007/000273 filed Jan. 26, 2007, which claims priority to United Kingdom Application No. GB 0601720.6 filed Jan. 27, 2006.

BACKGROUND OF THE INVENTION

This invention relates generally to a differential gear assembly of a motor vehicle, and particularly to an assembly in which a crown wheel and a differential casing are welded together to form a unitary assembly.

As is well known, a differential gear assembly of a motor vehicle includes a differential casing in which planetary and output gears rotate in mesh to permit opposite wheels of an axle to turn at different speeds. The differential casing is mounted for rotation in an axle housing and is driven by a crown wheel fixed on the differential casing and itself driven by a vehicle engine.

Previously, it has been common for the annular crown wheel to be bolted to the differential casing. One reason for this construction is to ensure that an input ratio of a differential can be selected during manufacture. Another reason is to ensure that the crown wheel can be replaced as a service item. Additionally, the cost of a one piece component is very high.

Permanent welding of the crown wheel to the differential casing can reduce costs if the advantages of selection and serviceability are not required. Other advantages are potential weight reduction and a more compact design. However, the crown wheel is case hardened after final machining, whereas the differential casing is of e.g., forged steel. Although welding of case hardened steel to relatively soft forged steel is possible using a filler material such as nickel, the weld quality is difficult to control, and the welding process is expensive. As an alternative, it has been proposed to hard turn or grind through the case hardening of the crown wheel to the relatively soft core to expose material suitable for welding, but this is also time consuming and expensive.

It has also been proposed to machine a mounting face of the crown wheel as an outward stepped form before hardening to ease removal of the hard case. However, this is also disadvantageous because, typically, the crown wheel must be press-quenched during the hardening process to prevent warping thereof, and the stepped form requires centering of a press tool and a mounting fixture, which is time consuming and difficult to achieve with reliability. This problem is exacerbated because the crown wheel is immersed in oil during quenching, and thus difficult, if not impossible, to observe. This latter problem is also particularly troublesome in relation to truck axles, where numerous final drive ratios may be provided for use with a common differential gear assembly. Thus, for example, twelve different ratios (meaning twelve different crown wheels) are provided, each of which requires a respective mounting fixture during press-quenching. If the wrong fixture is used, at least the crown wheel will be made unusable, and possibly the fixture and/or press tool will be damaged.

DE-A-10238236 discloses a construction in which the crown wheel is welded to the differential housing by a radially applied weld. For this reason, a back face of the crown wheel is cut away to give access for a welding tool and is not flat. The same technique is used at a radial weld of the differential housing and a cover so that the differential housing is cut away (or relatively extended) in an axial direction.

What is required is a solution to the aforementioned difficulties to facilitate welding of the crown wheel and the differential casing.

SUMMARY OF THE INVENTION

According to a first aspect of the invention, there is provided a welded assembly of a differential casing and a crown wheel. The differential casing has a rotational axis and a generally radially extending circular flange, and the circular flange has an axially protruding lip at a periphery thereof. The crown wheel has a circular recess for engagement with the lip at an interface. The circular recess extends radially outwardly of the lip to expose a radially outer side of the interface for welding.

This arrangement allows an axial face of the crown wheel to be flat during press-quenching, yet minimizes hard machining of the interface. Thus, because all of the relevant crown wheels can have such a flat face, the problem of fixture and press location during quenching is obviated. In one embodiment of the invention, the lip and the circular recess define substantially perpendicular circular faces at the radially outer side, and welding is performed by a high energy beam bisecting an angle between the circular faces. The crown wheel is sufficiently supported to ensure that gear thrust thereon is resisted.

In one embodiment, the crown wheel includes a flat annular face perpendicular to a rotational axis thereof, and the circular recess includes a concentric circular groove therein. The groove divides the flat annular face into concentric annular face portions which have substantially similar radial extent.

In one embodiment, the interface is at an oblique angle to the axis, for example in the range 50°-80° to the axis, and more specifically in the range 60°-70° to the axis. The interface is constituted by opposing flat circular faces of the differential casing and the crown wheel.

At a radially inner side, the interface is bounded by a circular wall at an oblique angle to the circular flange, which in one embodiment is in the range 25°-35°, and more specifically 30°.

In one embodiment, the radially outer side of the interface includes respective perpendicular surfaces of the crown wheel and the differential casing. In one example, the crown wheel is further recessed radially outboard of the interface so that the radially outer side of the interface is axially inboard of the flat annular face of the crown wheel.

In an alternative embodiment, the lip and the circular recess together define a substantially co-planar circular face at the radially outer side of the interface. In one example, the co-planar circular face is at an angle to the axis, typically 30°, to present an oblique face to a welding beam of high energy. The face is frusto-conical with respect to the rotational axis.

In such an embodiment, the circular recess includes a double indent having a substantially 'W' section, the central peak of which includes the interface on one side and a portion of the oblique face on the other side.

In one embodiment, the radially inner side of the circular recess is spaced from the corresponding side of the lip to define a circular clearance of limited axial extent.

According to a second aspect of the present invention, there is provided a crown wheel for a differential gear assembly of a vehicle. The crown wheel has an axis of rotation, a back face substantially perpendicular to the axis of rotation, and a coaxial groove in the back face adapted to define a circular welding interface between the crown wheel and a housing of a differential gear.

A weld is applied from a radially outerside at an acute angle to the back face, in one example in the range 25°-35°.

According to a third aspect of the invention, there is provided a method of producing a crown wheel for a differential gear assembly of a vehicle. The method includes the steps of producing an unhardened annular crown wheel having opposite axial faces. One axial face has a gear profile thereon, and the other axial face is flat. The method further includes the steps of soft machining a circular groove in the flat axial face, hardening the crown wheel, and hard machining the circular groove to reveal an unhardened surface.

In an alternative, the method may includes the steps of soft machining double concentric circular grooves in the flat axial face, the portion between the grooves being below the flat axial face, hardening the crown wheel, and hard machining adjacent faces of the grooves to reveal an unhardened continuous surface.

In both cases, the method may further include the step of welding the crown wheel to a differential casing having a circular projection engagable against the respective unhardened surface, in one example by a high energy beam directed at the radially outer interface.

BRIEF DESCRIPTION OF THE DRAWINGS

Other features of the invention will be apparent from the following description of preferred embodiments shown by way of example in the accompanying drawings in which:

FIG. 1 shows in transverse section a differential casing and crown wheel assembly.

FIG. 2 shows a weld region of FIG. 1 in enlarged detail.

FIG. 3 is a transverse section through the crown wheel of FIG. 1.

FIG. 4 shows the profile of the weld region of FIG. 3 in enlarged detail.

FIG. 5 is a partial transverse section through a differential casing of FIG. 1.

FIG. 8 is a scrap section showing the component parts of FIG. 7.

FIG. 9 shows in scrap section a weld profile for the embodiment of FIG. 6.

FIG. 10 shows in scrap section a weld profile for the embodiment of FIG. 7.

DETAILED DESCRIPTION OF THE PREFERRED EMBODIMENT

Figure 6:
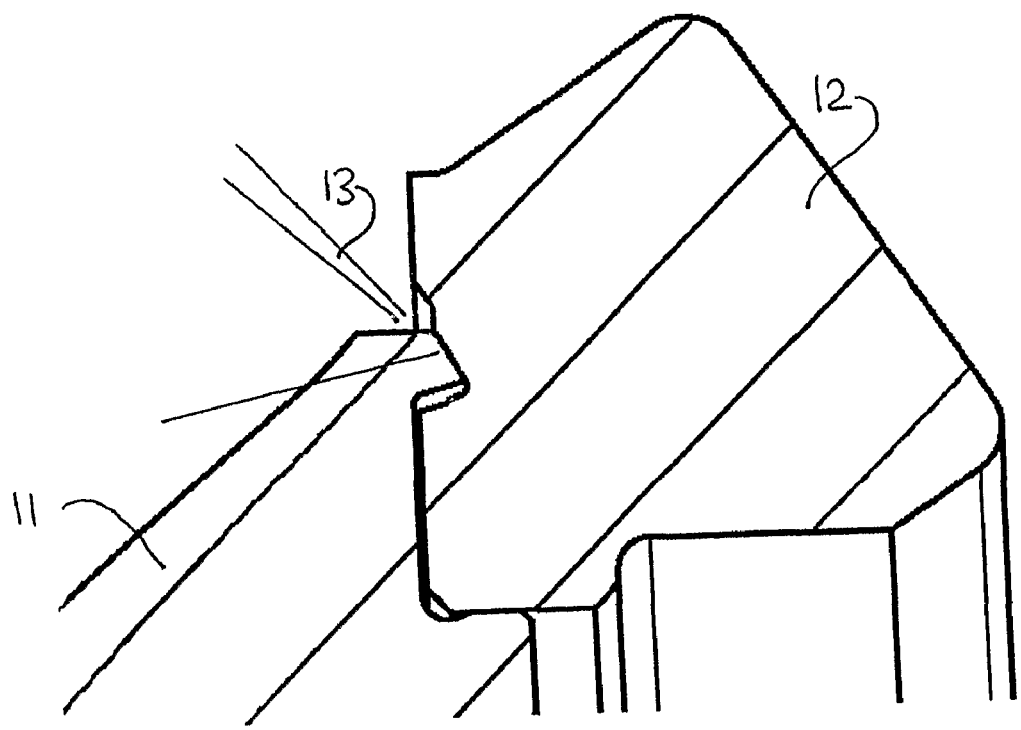
FIG. 6 illustrates a radial section of the arrangement of FIGS. 1 to 5.

With reference to FIG. 1, a differential gear assembly 10 includes a differential casing 11 of forged steel and a crown wheel 12 of case hardened steel. The differential casing 11 and the crown wheel 12 are welded together in the vicinity identified by a circle 2 (and shown in greater detail in FIG. 2) by a laser welding tool, of which the laser cone 13 is illustrated.

As shown in FIG. 5, the differential casing 11 is bowl-like and generally symmetrical about a rotational axis A. A cylindrical stub 14 defines an inner bearing surface associated with one drive shaft and an outer bearing surface associated with an axle housing. Corresponding surfaces are provided on a circular plug which, in use, is located in a circular recess 15 opposite the cylindrical stub 14. The usual planetary gears are rotatable about shafts located in four equispaced apertures 16.

The differential casing 11 has a circular continuous flange 17 at the mouth thereof, an axially outer periphery 18 of which tapers as illustrated towards a stub side to form a generally flat frusto-conical surface.

At the stub side, the circular continuous flange 17 defines a circular radial shoulder 19 adapted to receive the crown wheel 12 as a close or press fit. An outer portion 20 of the circular continuous flange 17 projects axially towards the stub side and terminates at a circular knife edge 21 inboard of a radially outer periphery 22. The outer portion 20 tapers inwardly of the circular continuous flange 17 from the circular knife edge 21 to the radially outer periphery 22 at an angle of 20° to a diameter (as represented by numeral 23), thus forming a frusto-conical face 24 having a width 25 of about 10 mm. Other angles, e.g. 30°, are possible, and the width 25 may be smaller or greater as required.

As best shown in FIG. 2, when assembled onto the differential casing 11, the crown wheel 12 is in contact with the frusto-conical face 24, but axially clear of the differential casing 11 inboard of the frusto-conical face 24.

The crown wheel 12 includes an annulus having a gear form thereon (typically hypoid or spiral bevel) and represented by chain-dot lines 30. The chain-dot lines 30 represent pitch angle, face angle and root angle of gear teeth. An inner diameter includes an axially directed circular face 31 adapted to fit with the circular radial shoulder 19. At an axial side opposite the gear teeth, the crown wheel 12 has an axial face 32 with a circular groove 33 machined therein after hardening.

The axial face 32 is thus flat during hardening and accordingly is adapted for application of a press tool thereto during press-quenching without the need for a location step. After hardening, the circular groove 33 is machined by hard turning to reveal a relatively soft core.

The circular groove 33 has an advantageous form, best illustrated in FIG. 4 and includes a radially innermost major recess 34 and a radially outermost minor recess 35.

The radially innermost major recess 34 is a generally triangular section having walls 36 and 37 at an obtuse included angle of, for example, 100° and arranged at about 30 ° to an inner side of the axial face 32. The respective walls 36 and 37 are represented by the angles 40 and 41.

The radially outermost minor recess 35 includes a radially outer wall 38, in one example, parallel to the wall 37 and a true radial wall 39 linked to the wall 37 so that the profile of the generally radially directed walls 37, 38 and 39 is stepped, as illustrated.

As will be apparent, the frusto-conical face 24 and the wall 37 are in planar contact on assembly of the components, as illustrated in FIG. 1. The radially outermost minor recess 35 allows unimpeded access for the laser cone 13 to form a circular weld around the circular continuous flange 17 at a component interface. Because the walls 37 and 38 are at the same relative angle, both can readily be formed in a straight-forward plunge and turn machining operation with a suitable form tool.

FIG. 6 illustrates the general arrangement described in relation to FIGS. 1 to 5, in which the differential casing 11 is connected to the crown wheel 12 via the laser cone 13. A resulting weld 51 is illustrated in FIG. 9 and is directed inwardly from the corner at a junction of the radially outer periphery 22 and the radial wall 39.

Figure 7:
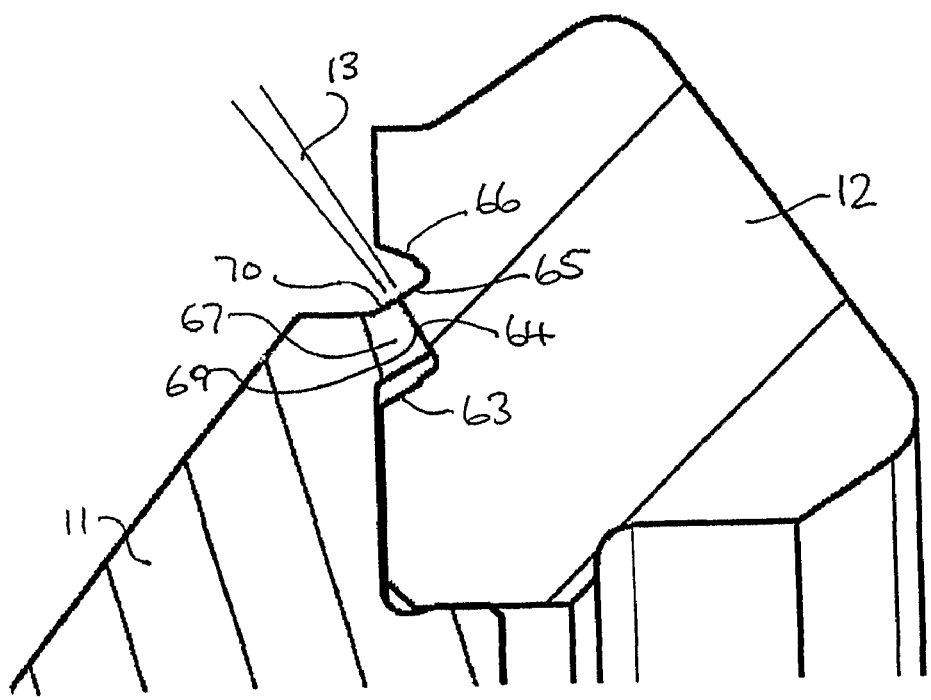
FIG. 7 shows an alternative profile of FIG. 6.

An alternative engagement profile is illustrated in FIGS. 7 and 8. As is readily apparent from FIG. 7, the circular groove formed in the axial face of the crown wheel 12 is of a generally 'W' form and includes a radially inner recess 61 and a radially outer recess 62.

The radially inner recess 61 generally corresponds to the radially innermost major recess 34 and is of triangular form having walls 63 and 64 arranged at an included angle of about 90°. The radially outer recess 62 is also of triangular form and has an included angle of about 60° defined by a radially inner wall 65 and a wall 66.

A radially outer periphery 67 of the circular continuous flange 17 includes an upturned lip having an orthogonal edge 69 at about 30° to a radius and at a matching angle to the wall 64. Additionally, and outer face of a lip 70 is aligned with the radially inner wall 65 to present a generally planar circular surface to the laser cone 13.

FIG. 10 illustrates a weld 71 obtained by use of the embodiment of FIGS. 7 and 8, which has an advantageous convex outer profile rather than the concave profile shown in FIG. 9. A convex weld profile has lower risk of stress concentrations and also reduces localized heating of the crown wheel 12 and the differential casing 11 due to proximity of the laser cone 13. Because localized heating is reduced, the laser weld power required is also reduced as compared with the embodiment of FIG. 9. There is also a reduced risk that crown wheel material radially outside the joint will partially fill the weld and form the less desirable concave profile. A further advantage of the planar face presented by the radially inner wall 65 and the lip 70 is that localized beam reflection is minimal, and thus substantially all of the beam energy is used in welding.

The precise shape of the radially outer recess 62 is not important, provided a planar surface is presented substantially orthogonal to the laser cone 13 and sufficient radially outer clearance for the laser cone 13 is provided by the wall 66. At an radially inner side, suitable clearances are provided to ensure touching contact of the orthogonal edge 69 and the wall 64.

FIG. 8 additionally illustrates an advantageous machining process of the radially inner recess 61 and the radially outer recess 62. As has been explained above, for purposes of press-quenching during the hardening step, the axial 'back' face 32 of the crown wheel 12 should be 'flat' so that location of a press tool over a protuberance is not required. The location grooves illustrated in FIGS. 6 and 7 do not impede press-quenching because they can be formed by hard turning after the hardening step.

However, the radially inner recess 61 and the radially outer recess 62 may be partially formed before hardening, i.e., whilst the crown wheel 12 is relatively soft, by removal of two recesses 72 and 73 shown as shaded areas in FIG. 8. Thus, removal does not impede press-quenching, and a land 74 remains between the recesses 72 and 73 to provide additional support.

After hardening, the radially inner recess 61 and the radially outer recess 62 are fully formed by hard machining of areas 75 and 76, but the volume of material to be removed is much reduced and is restricted to forming of the mating wall 64 and the radially inner wall 65.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. An assembly of a differential casing and a crown wheel comprising:
   a casing having a rotational axis and a generally radially extending circular flange, wherein the generally radially extending circular flange has an axially protruding lip at a periphery thereof; and
   a crown wheel having a circular recess for engagement with the axially protruding lip at an interface, wherein the circular recess extends radially outwardly of the axially protruding lip to expose a radially outer side of the interface for welding,
   wherein said interface is a first interface, the casing having a circular radial shoulder with a radially outwardly facing surface, and
   wherein the crown wheel has a radially inwardly facing surface for engagement with the radially outwardly facing surface of the circular radial shoulder at a second interface different from the first interface.

2. The assembly according to claim 1 wherein an axial face of the crown wheel is flat on a side of the circular recess.

3. The assembly according claim 1 wherein the interface comprises substantially perpendicular circular faces of the axially protruding lip and the circular recess.

4. The assembly according to claim 1 wherein the interface is bounded by a circular wall at an oblique angle to the generally radially extending circular flange at a radially inner side of the interface.

5. The assembly according to claim 1 wherein the crown wheel is further recessed radially outboard of the interface.

6. The assembly according to claim 1 wherein a radially inner side of the circular recess is spaced from a corresponding side of the axially protruding lip to define a circular clearance.

7. The assembly according to claim 1 wherein the axially protruding lip is at a radially outer periphery of the generally radially extending circular flange.

8. The assembly according to claim 1 wherein the axially protruding lip terminates at a circular knife edge radially inboard of a radially outer periphery of the axially protruding lip.

9. The assembly according to claim 1 wherein the second interface is positioned radially inboard of the first interface.

10. The assembly according to claim 1 wherein an axial face of the crown wheel is flat on a side of the circular recess and the circular recess divides the axial face into concentric annular face portions, the casing having an axial face for engagement with one of the face portions at a third interface different from said first interface and the second interface.

11. The assembly according to claim 10 wherein the third interface is radially inboard of the first interface and radially outboard of the second interface.

12. The assembly according to claim 1 wherein an axial face of the crown wheel is flat on a side of the circular recess, and the crown wheel has a gear form on a face axially opposite that of the circular recess.

13. The assembly according to claim 12 wherein the circular recess divides the axial face into concentric annular face portions and teeth of the gear form are positioned axially opposite one of the face portions.

14. An assembly of a differential casing and a crown wheel comprising:
   a casing having a rotational axis and a generally radially extending circular flange, wherein the generally radially extending circular flange has an axially protruding lip at a periphery thereof; and a crown wheel having a circular recess for engagement with the axially protruding lip at an interface, wherein the circular recess extends radially outwardly of the axially protruding lip to expose a radially outer side of the interface for welding, wherein the interface is at an oblique angle to the rotational axis and is consituted by adjacent coplanar circular faces of the axially protruding lip and the circular recess.

15. The assembly according to claim 14 wherein the circular recess comprises a double indent having a substantially 'W' section; a central peak of which comprises the interface on one side, and a portion of a oblique face on another side.

* * * * *